United States Patent Office 3,041,386
Patented June 26, 1962

3,041,386
PROPYLENE TETRAMER
Aubrey A. Feerick and King I. Glass, El Dorado, Ark., assignors to Monsanto Chemical Company, St. Louis, Mo., a corporation of Delaware
No Drawing. Filed June 22, 1959, Ser. No. 821,711
3 Claims. (Cl. 260—683.15)

This invention relates to propylene tetramer and more specifically to the catalytic polymerization of propylene to produce propylene tetramer.

The process of polymerizing propylene in the presence of a solid phosphoric acid catalyst is well known in the art. The process was developed many years ago and had for its primary purpose that of producing polygasoline which was used as blending stock. The reaction mixture obtained in this process contains substantial quantities of propylene tetramer together with other propylene polymers and hydrocarbons. For blending purposes, the mixture was usable as such in most cases. Insofar as the production of polygasoline was concerned, the process provided to be exceptionally flexible permitting considerable variation in feed composition and reaction conditions.

In recent years, propylene tetramer per se has come to be an exceptionally useful composition as an intermediate in the preparation of a variety of organic compounds. For example, propylene tetramer is now used in considerable quantities as the alkylating agent in the preparation of dodecyl benzene which is then sulfonated to produce an exceptionally useful detergent. Because of this rise in the utility of propylene tetramer, the conventional polygas process was explored as a possible method for producing high quality propylene tetramer. These investigations revealed the existence of some critical factors in the conversion of the conventional polygas process to the production of propylene tetramer which was to be used as a chemical intermediate.

It is an object of this invention to provide an improvement in the process for producing propylene tetramer by the polymerization of propylene in the presence of a solid phosphoric acid catalyst. It is a particular object of this invention to provide a propylene tetramer particularly suited for the preparation of dodecyl benzene by the polymerization of propylene in the presence of a solid phosphoric acid catalyst. Additional objects will become apparent from the description of this invention.

As previously mentioned, the conventional polygas process resulted in a reaction product containing substantial quantities of propylene tetramer together with other propylene polymers and hydrocarbons. In the past, $C_4$ through $C_{11}$ hydrocarbons have been separated from the reaction product mixture and recycled to the polymerization reactor. It has now been discovered that if the recycle stream is limited to $C_4$ through $C_9$ hydrocarbons and if these hydrocarbons are recycled to the polymerization reactor at a recycle rate below a maximum of 1.5 part by liquid volume of recycle for each part by liquid volume of propylene-containing hydrocarbon feed stream, the propylene tetramer isolated from the reaction product mixture is much more reactive in the production of dodecyl benzene, permits the production of higher yields of dodecyl benzene and permits the production of dodecyl benzene of much improved color. The results obtainable by means of the present invention are illustrated by the following example:

A $C_3$ hydrocarbon fraction containing approximately 2 parts by weight of propylene for each part by weight of propane was charged to a polymerization reactor containing a solid phosphoric acid polymerization catalyst. During the reaction the phosphoric acid catalyst was kept at the proper state of hydration by the constant addition of a very small amount of water (about 0.1 weight percent) to the hydrocarbon feed stream to the reactor. The reactor was maintained at an average temperature of about 200° C. and a pressure of 750 p.s.i.g. The space velocity was approximately 0.14 gallon of hydrocarbon feed per hour per pound of catalyst. The reactor effluent was filtered and then propane and lighter hydrocarbons stripped therefrom in a stripping column. The bottoms from the stripping column were passed to a recycle column wherein $C_4$ through $C_9$ hydrocarbons were taken overhead, $C_{10}$ and $C_{11}$ hydrocarbons recovered from an intermediate section of the column and crude tetramer removed as bottoms from the column. The crude tetramer was introduced into the intermediate section of a product column and product propylene tetramer taken overhead.

This procedure was followed in two comparative runs. Runs A and B. In run A, $C_4$ through $C_{11}$ hydrocarbons were recycled to the polymerization reactor and in run B $C_4$ through $C_9$ hydrocarbons were recycled to the polymerization reactor. The results obtained are set forth in the following table:

| | Run A | Run B |
|---|---|---|
| Recycle | $C_4$–$C_{11}$ | $C_4$–$C_9$ |
| Recycle rate (parts by volume of recycle per part by volume of feed) | 1.25 | 1.22 |
| Percent Yield of Tetramer | 50 | 48 |

A comparison of the results set forth in the preceding table, indicates that insofar as the yield of product propylene tetramer is concerned, recycling only $C_4$ through $C_9$ hydrocarbons actually resulted in a slight drop in yield of product propylene tetramer. A more significant effect was manifested when these propylene tetramers were then used to produce dodecyl benzene.

Dodecyl benzene was prepared by mixing 50 parts by weight of propylene tetramer with 200 parts by weight of benzene and saturating the mixture was anhydrous HCl. The mixture, with constant agitation, was maintained at a temperature of 40° C. One part by weight of anhydrous aluminum chloride was then added to the reaction mixture and the alkylation reaction carried out at 40° C. After the reaction was complete, the aluminum chloride was separated therefrom and the crude reaction mixture purified by fractional distillation under reduced pressure. All material boiling up to 115° C. at 20 mm. Hg absolute was separated as an intermediate fraction. Substantially pure dodecyl benzene was separated as that fraction boiling above the intermediate fraction and up to 155° C. at 2 mm. Hg absolute.

When dodecyl benzene was prepared in accordance with this procedure using propylene tetramer produced in run A as set forth above, an intermediate fraction in the amount of 12.1% by weight and a yield of dodecyl benzene of 75.7% by weight was obtained. When producing dodecyl benzene by this procedure utilizing the propylene tetramer obtained in run B set forth above, an intermediate fraction of only 10.3% by weight was obtained together with a 76.3% yield of dodecyl benzene. The reactivity of the propylene tetramer produced in run B in the dodecyl benzene process was significantly greater than the reactivity of the propylene tetramer produced in run A. Dodecyl benzene produced using the propylene tetramer from run B, exhibited significantly better color than did the dodecyl benzene produced from the propylene tetramer of run A. These results clearly indicate the advantages to be gained by limiting the recycle in the propylene polymerization reaction to the $C_4$ through $C_9$ hydrocarbons.

The solid polymerization catalyst used in the practice of this invention is well known in the art and is generally referred to as the "solid phosphoric acid catalyst." The catalyst consists of a pre-calcined mixture of a suitable phosphoric acid, such as pyrophosphoric acid, and a siliceous adsorbent such as kieselguhr or infusorial earth. The preparation of this catalyst is described in U.S. 1,993,513.

The polymerization reaction is carried out in the liquid phase with the temperature being mutually dependent upon the pressure and space velocity of the charge to the reaction zone. Temperatures in the range of from about 120° C. to about 350° C. are operable, with temperatures in the range from about 150° C. to about 250° C. being preferred. Superatmospheric pressures up to about 1000 pounds per square inch can be utilized. Space velocities ranging from about 0.1 to 10 volumes of monomer charge per volume of catalyst per hour are particularly desirable.

The solid phosphoric acid catalyst used in the practice of this invention is maintained at the desired degree of hydration by introducing water together with the charge to the polymerization reactor containing the catalyst. Water contents ranging from about 0.05 to about 1% by weight of the hydrocarbon charge have been found suitable.

The hydrocarbon feed stream to the reactor generally contains from about 20 to about 70 percent by weight of total composition of propylene together with other diluent hydrocarbons, such as propane. Inert diluents, other than propane, such as other lower alkanes, can also be present in the feed stock.

The $C_4$ through $C_9$ hydrocarbons present in the reaction product obtained from the polymerization reactor can be separated therefrom by any convenient manner such as by fractional distillation. This hydrocarbon stream is recycled to the polymerization reactor at a recycle rate below a maximum of 1.5 parts by liquid volume of recycle for each part by liquid volume of propylene-containing hydrocarbon feed streams. Preferably the recycle rate is maintained in the range of from about 0.05 to about 1.3 parts by liquid volume of recycle for each part by liquid volume of propylene-containing hydrocarbon feed stream.

The reaction products of the polymerization reaction can be treated by any of the techniques well known to those skilled in the art to separate therefrom propylene tetramer. Separation by fractionation is particularly suitable.

What is claimed is:

1. In a process for the production of propylene tetramer wherein a liquid propylene-containing hydrocarbon feed stream is polymerized in a single stage polymerization reactor at an elevated temperature and under superatmospheric pressure up to about 1000 pounds per square inch in the presence of a solid phosphoric acid catalyst to produce a reaction product containing substantial quantities of propylene tetramer together with other propylene polymers and hydrocarbons and a propylene tetramer recovered therefrom, the improvement which consists essentially of separating a fraction consisting of $C_4$ through $C_9$ hydrocarbons from said reaction product and recycling said $C_4$ through $C_9$ hydrocarbon fraction to said polymerization reactor at a recycle rate ranging from 0.05 to 1.5 parts by liquid volume of recycle for each part by liquid volume of propylene-containing hydrocarbon feed stream.

2. The process as described in claim 1 wherein the propylene content of the hydrocarbon feed stream is in the range of from about 20% to about 70% by weight of total composition.

3. The process as described in claim 2 wherein the reaction is carried out at a temperature in the range from about 150° C. to about 250° C.

References Cited in the file of this patent

UNITED STATES PATENTS

| | | |
|---|---|---|
| 2,572,724 | Hinds et al. | Oct. 23, 1951 |
| 2,802,890 | Brooks | Aug. 13, 1957 |